(12) United States Patent
Kim

(10) Patent No.: US 7,850,340 B2
(45) Date of Patent: Dec. 14, 2010

(54) DISPLAY APPARATUS

(75) Inventor: Seong-soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 11/349,892

(22) Filed: Feb. 9, 2006

(65) Prior Publication Data
US 2006/0203481 A1    Sep. 14, 2006

(30) Foreign Application Priority Data
Mar. 8, 2005    (KR) ................ 10-2005-0019356

(51) Int. Cl.
*F21S 4/00*    (2006.01)
*F21V 21/00*    (2006.01)

(52) U.S. Cl. ................ 362/249.02; 362/296.01; 362/311.02; 362/800

(58) Field of Classification Search ............ 362/28–29, 362/125, 232, 249–250, 285, 296, 311, 335, 362/347, 418, 430, 603, 800, 249.02, 296.01, 362/311.02; 40/124.02, 443, 550, 559, 661.02; 348/730, 836–842
See application file for complete search history.

(56) References Cited

U.S. PATENT DOCUMENTS

| | | | | |
|---|---|---|---|---|
| 5,027,258 A | * | 6/1991 | Schoniger et al. ........... | 362/629 |
| 6,054,981 A | * | 4/2000 | Kimoto et al. .............. | 345/211 |
| 6,767,107 B1 | * | 7/2004 | Leifer et al. .................. | 362/33 |
| 7,015,988 B2 | * | 3/2006 | Ogino ......................... | 349/62 |
| 7,186,003 B2 | * | 3/2007 | Dowling et al. ............. | 362/234 |
| 2003/0116414 A1 | * | 6/2003 | Maeda et al. ............. | 200/56 R |

FOREIGN PATENT DOCUMENTS

| | | |
|---|---|---|
| JP | 2004-361664 | 12/2004 |
| JP | 2005-12616 | 1/2005 |

OTHER PUBLICATIONS

Chinese Office Action dated Aug. 10, 2007 issued in CN 2006100567900.

* cited by examiner

*Primary Examiner*—Jason Moon Han
(74) *Attorney, Agent, or Firm*—Stanzione & Kim, LLP

(57) ABSTRACT

A display apparatus includes a display part to display an image thereon, a front cover to surround a front surface of the display part, a light source unit having a plurality of light sources and a light source supporter to support the plurality of light sources to emit light toward a predetermined illumination target, and a light reflector provided on a side of the front cover to reflect light emitted toward the predetermined illumination target, and having the predetermined illumination target. Thus, the display apparatus uses a plurality of light sources to improve an external appearance.

13 Claims, 3 Drawing Sheets

DISPLAY APPARATUS

CROSS-REFERENCE TO RELATED APPLICATIONS

This application claims the benefit of Korean Patent Application No. 2005-19356, filed on Mar. 8, 2005, in the Korean Intellectual Property Office, the disclosure of which is incorporated herein by reference in its entirety.

BACKGROUND OF THE INVENTION

1. Field of the Invention

The present general inventive concept relates to a display apparatus, and more particularly, to a display apparatus which uses a plurality of light sources to improve an external appearance thereof.

2. Description of the Related Art

Generally, a flat panel display apparatus such as a liquid crystal display (LCD) or a plasma display apparatus (PDP) comprises a display part to display an image thereon, a front cover to surround a front surface of the display part, and a rear cover to protect a rear surface of the display part.

The display apparatus may further comprise a front mask with a smooth surface disposed on the front surface of the display part to improve an external appearance. As the flat panel display apparatus has been made large-sized and of high quality, it has become important to improve the external appearance thereof in various ways.

SUMMARY OF THE INVENTION

Accordingly, the present general inventive concept provides a display apparatus that uses a plurality of light sources to improve an external appearance.

Additional aspects of the general inventive concept will be set forth in part in the description which follows and, in part, will be obvious from the description, or may be learned by practice of the general inventive concept.

The foregoing and/or other aspects of the present general inventive concept are achieved by providing a display apparatus, comprising a display part to display an image thereon, a front cover to surround a front surface of the display part, a light source unit including a plurality of light sources and a light source supporter to support the plurality of light sources to emit light toward a predetermined illumination target, and a light reflector provided on a side of the front cover to reflect light emitted toward the predetermined illumination target, and including the predetermined illumination target.

The display apparatus may further comprise a lens provided between the plurality of light sources and the light reflector.

The light source unit may further comprise an accommodator to accommodate the light source supporter, and a light source support frame formed with a mounting part to mount the light source unit to the front cover.

The light sources may comprise a light emitting diode (LED).

The display apparatus may further comprise a power switch provided on a first side of the light reflector, and a controller to control power supplied to the light sources to emit light toward the predetermined illumination target when the power switch is turned off.

The light source unit may be disposed on a lower central part of the front cover.

The foregoing and/or other aspects of the present general inventive concept are also achieved by providing a display apparatus, comprising a display part to display images, a light reflector extending along a side thereof and having at least one function button for the display part disposed thereon, and an illumination unit to illuminate a portion of the light-reflector when the display part is in a first operational mode and not to illuminate the portion of the light reflector when the display part is in a second operational mode.

The foregoing and/or other aspects of the present general inventive concept are also achieved by providing a display part usable with a display apparatus to display images, the display part comprising a front cover to surround a front surface of the display part, a light reflector extending from a side of the front cover in a direction toward the front surface of the display part, and a light source unit on the side of the front cover to emit one or more lights to a predetermined target on the light reflector.

BRIEF DESCRIPTION OF THE DRAWINGS

These and/or other aspects of the present invention will become apparent and more readily appreciated from the following description of the embodiments, taken in conjunction with the accompany drawings of which.

DETAILED DESCRIPTION OF THE PREFERRED EMBODIMENTS

Figure 1:
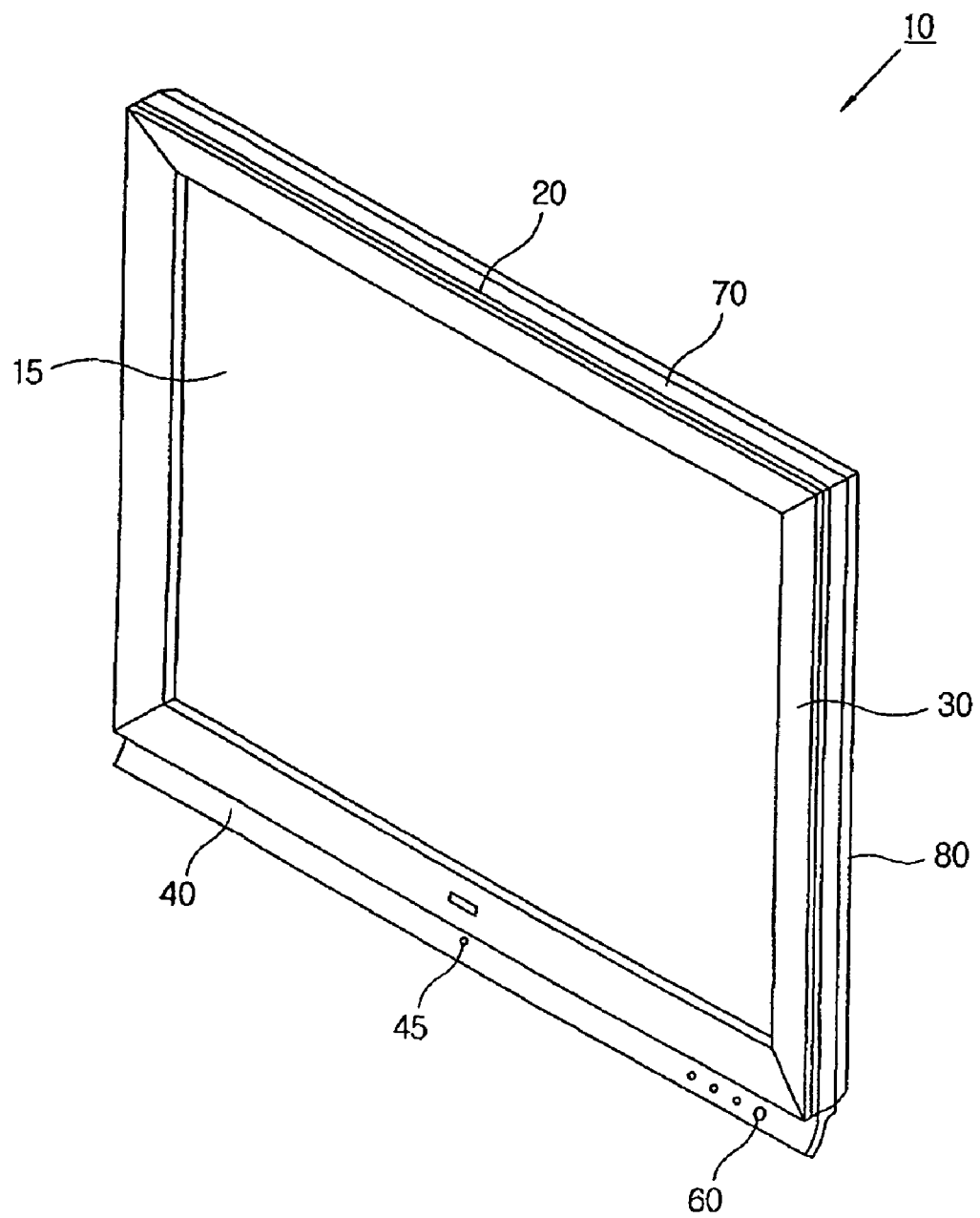
FIG. 1 is a front perspective view illustrating a display apparatus according to an embodiment of the present general inventive concept.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
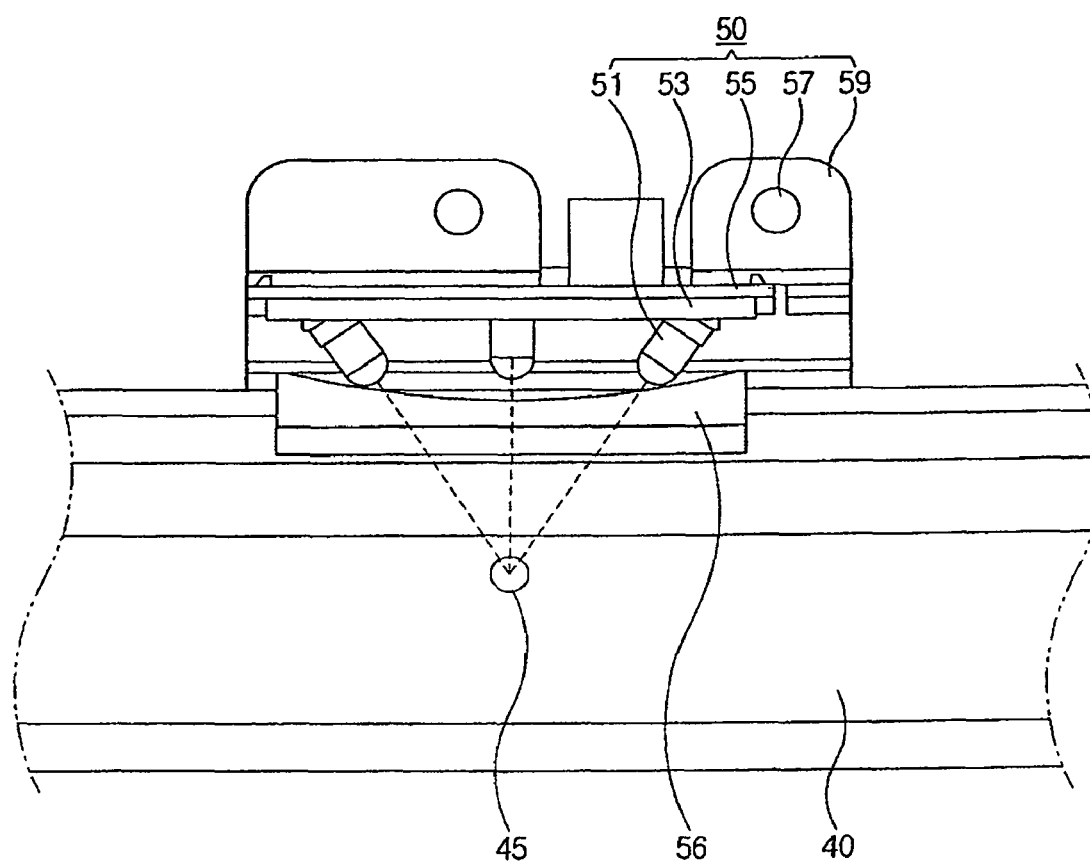
FIG. 2 is a front view illustrating a light source unit and a light reflector of the display apparatus of FIG. 1 according to an embodiment of the present general inventive concept.
Figure 3:
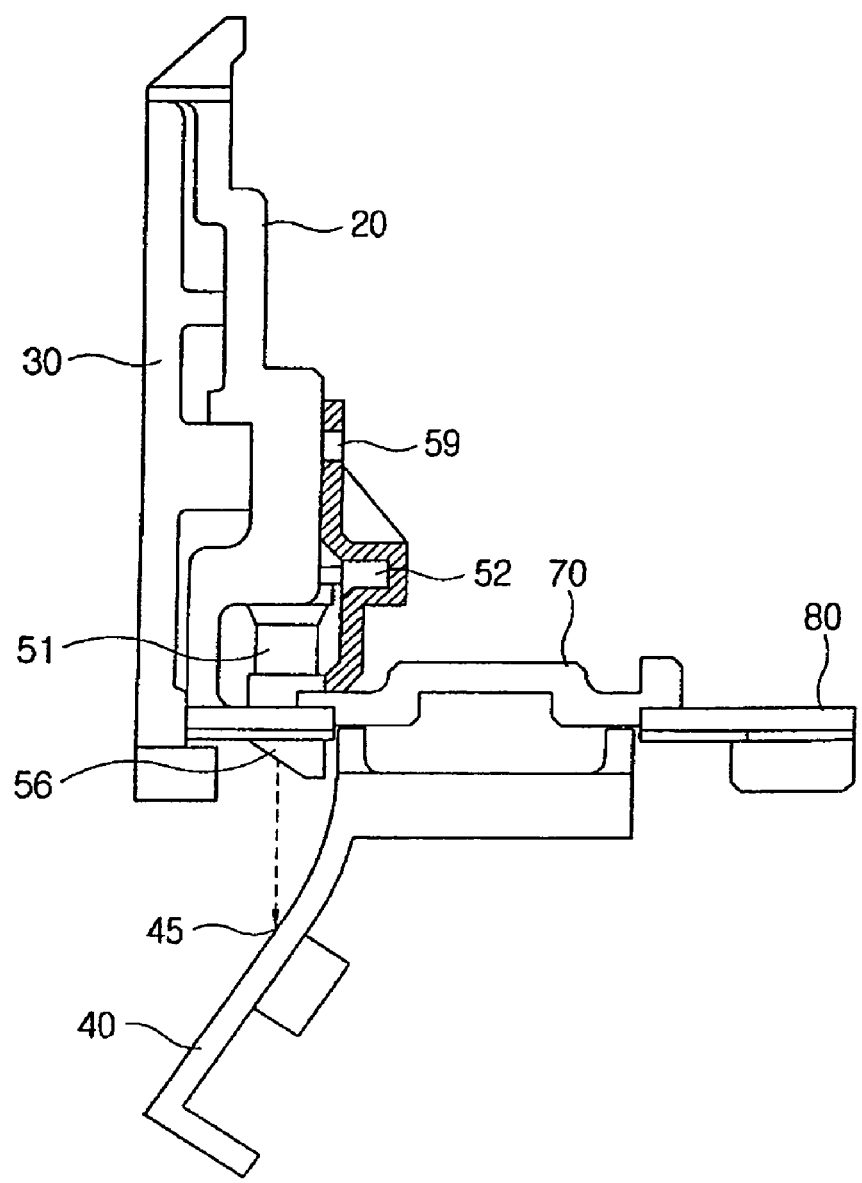
FIG. 3 is a side sectional view illustrating the light source unit and the light reflector of the display apparatus of FIG. 1 according to an embodiment of the present general inventive concept.

FIG. 1 is a front perspective view illustrating a display apparatus 10 according to an embodiment of the present general inventive concept. FIG. 2 is a front view illustrating a light source unit 50 and a light reflector 40 of the display apparatus 10 of FIG. 1 according to an embodiment of the present general inventive concept; and FIG. 3 is a side sectional view illustrating the light source unit 50 and the light reflector 40 of the display apparatus 10 of FIG. 1 according to an embodiment of the present general inventive concept. The display apparatus 10 comprises a display part 15 to display an image thereon, a front cover 20 to surround a front surface of the display part 15, a side frame 70 to support the display part 15, and a rear cover 80 provided on a rear surface of the display part 15 to protect the display part 15. Additionally, a front mask 30 may be provided on a front surface of the front cover 20. The display apparatus 10 further includes the light reflector 40 disposed at a bottom of the display part 10, a predetermined illumination target 45 disposed on the light reflector 40, and a power switch 60 disposed on the light reflector 40.

Referring to FIG. 2, the light source unit 50 comprises a plurality of light sources 51 to emit light, and a light source supporter 53 to support the plurality of light sources 51 to emit light toward the predetermined illumination target 45.

The plurality of light sources 51 are arranged on a lower part of the front cover 20 to emit light toward the illumination target 45 disposed in the light reflector 40 (described below). Here, the light sources 51 may be provided as a light emitting diode (LED), however it should be understood that the scope of the present general inventive concept is not intended to be limited thereto. Other types of light sources may also be used. The light sources 51 may further comprise a straight traveling supporter such as a reflecting mirror to guide the light to travel straight to the illumination target 45. Various numbers and/or colors of the light sources 51 may be used with the present general inventive concept according to a size of the display apparatus 10. For example, the light sources 51 may include three or more light sources 51. Also, a driving substrate 55 may be provided to maintain an electrical connection with the respective light sources 51 and to supply power to the respective light sources 51 from outside to control the light sources 51 to emit light.

The light source supporter 53 supports the respective light sources 51 to control the light emitted from the light sources 51 to be emitted toward the illumination target 45. As illustrated in FIG. 2, if the illumination target 45 is disposed on a lower part of the display apparatus 10, two of the light sources 51 that are positioned on a far right and a far left of a light source arrangement may be inclinedly supported toward the illumination target 45. The light supporter 53 may be disposed between the driving substrate 55 and the light sources 51 as illustrated in FIG. 2.

Referring to FIGS. 2 and 3, the light source unit 50 may further comprise a light source support frame 59 to accommodate the light sources 51 and the light supporter 53, and to mount the light source unit 50 to the front cover 20. The light source support frame 59 may comprise an accommodator 52 to horizontally accommodate the light source supporter 53 which supports the light sources 51. The accommodator 52 may be provided as a guide which is vertically bent to a plate surface to accommodate the light source supporter 53 and/or may be provided with a coupling hole to couple the light source supporter 53 and the light source support frame 59 using a fastener (e.g., a screw). A mounting part 57 may be provided on a first side of the light source support frame 59 to mount the light source support frame 59, which accommodates the light sources 51 and the light source supporter 53, to the front cover 20 of the display apparatus 10. The light source unit 50 may be provided on a lower central part of the front cover 20.

A lens 56 may be provided between the respective light sources 51 and the light reflector 40 (described below) to collect or diverge the light emitted from the light sources 51. If the light emitted from the light sources 51 is divergent, a convex lens may be provided to improve light collection toward the illumination target 45. If the light emitted from the light sources 51 propagates collectively, a concave lens may be provided to diverge the light, thereby making the light spread smoothly. Here, the lens 56 may be made of glass, plastic, etc., and may be mounted to the light source support frame 59 or may be integrally formed on the light source support frame 59.

The light reflector 40 may be provided across a lower side, a lateral side, or an upper side of the front cover 20. For example, as illustrated in FIG. 1, the light reflector 40 may be provided on the lower side of the front cover 20. The light reflector 40 is provided with the illumination target 45 at which the light emitted from the light sources 51 is directed and collected. The light reflector 40 may be shaped like a curved plate to reflect the light incident on the illumination target 45 in forward and downward directions. Alternatively, the light reflector 40 may be provided as an inclined plate. A surface of the light reflector 40 may be processed for better light collection and reflection. A predetermined mounting part (not shown) may be integrally formed on a first side of the light reflector 40 to mount the light reflector 40 to the front cover 20 or the side frame 70. Here, a position of the illumination target 45 is not limited to the lower side of the front cover 20, and may be provided at various positions according to a desired external appearance.

As illustrated in FIG. 1, a function button may be provided on the first side of the light reflector 45 to operate the display apparatus 10. The function button may comprise a power switch 60 and/or other various function buttons.

Hereinbelow, operation of the display apparatus 10 according to an embodiment of the present general inventive concept is described as follows.

The light source unit 50 may be mounted to the lower part of the front cover 20, and the light reflector 40 provided with the illumination target 45 may be disposed on a lower side of the light source unit 50. If the light sources 51 emit light with external power, the emitted light is directed to and collected on the illumination target 45 disposed on the light reflector 40, and is then reflected in the forward or the downward direction. Accordingly, the display apparatus 10 exposes light to the front, thereby improving the external appearance overall.

A controller may be provided between the light sources 51 and the power switch 60 disposed on the first side of the light reflector 40 to control light emission of the light sources 51, thereby making the light sources 51 emit light when certain conditions are met. For example, the light sources 51 may emit the light when the display apparatus 10 is set to a power standby mode. For example, the light sources 51 may not emit light when the display apparatus 10 operates. When the power switch 60 is turned off, the controller receives an off signal of the power switch 60, and controls power to be supplied to the light sources 51 to emit light, thereby indicating that the display apparatus 10 is in the power standby mode or off mode.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus, comprising:
   a display part to display images;
   a light reflector extending along a side thereof and having at least one function button for the display part disposed on the light reflector; and
   an illumination unit having a plurality of light sources to emit light in a direction away from the display part and to illuminate a portion of the light reflector when the display part is in a first operational mode which includes one of an OFF mode and a power save mode and not to illuminate the portion of the light reflector when the display part is in a second operational mode which includes an ON mode.

2. The display apparatus according to claim 1, wherein the plurality of light sources of the illumination unit emit light downward from under the display part toward an illumination target on the light reflector; and the illumination unit further comprises:
   a light source supporter attached to a bottom surface of the display part to support the plurality of light sources.

3. The display apparatus according to claim 2, wherein the plurality of light sources are arranged in a line parallel to a surface of the display part and a first light source at a first end of the line is angled in a first direction to emit light to the illumination target and a second light source at a second end of the line is angled in a second direction to emit light to the illumination target.

4. The display apparatus according to claim 1, wherein the illumination unit further comprises:
   a light source support frame having a mounting part to be mounted to a rear side of a front cover of the display apparatus; and
   a driving part disposed on the light source supporter to drive the plurality of light sources.

5. The display apparatus according to claim 4, wherein the light source support frame comprises:
   an accommodator in which the light source support frame is horizontally accommodated adjacent to the rear side of the front cover of the display apparatus.

6. The display apparatus according to claim 4, wherein the illumination unit further comprises:
   a lens disposed beneath the plurality of light sources to direct the emitted light toward an illumination target.

7. The display apparatus according to claim 1, wherein the at least one function button is formed to enable a user to change between the first and second operational modes of the display part.

8. The display apparatus according to claim 1, further comprising:
   a power supply control to supply power to the illumination unit when the display apparatus is in a non-operating mode and to cut off power to the illumination unit when the display apparatus is in an operating mode.

9. The display apparatus according to claim 1, wherein the display part is one of a flat panel LCD and a plasma display panel.

10. The display apparatus according to claim 1, wherein the light reflector extends along a lower surface of the display part.

11. The display apparatus according to claim 1, wherein the light reflector is shaped as one of a curved-plate that extends from a lower part of the display part toward a front side thereof and an inclined plate extending from the lower part of the display part toward the front side thereof.

12. The display apparatus according to claim 11, wherein the light reflector comprises a mounting part integrally formed on a side of the light reflector to mount the light reflector to the display part.

13. The display apparatus according to claim 1, wherein at least one of the plurality of light sources comprises:
   a light emitting diode (LED).

* * * * *